US010587432B2

(12) United States Patent
Marchand et al.

(10) Patent No.: US 10,587,432 B2
(45) Date of Patent: Mar. 10, 2020

(54) HARDWARE COMPONENT AND METHOD FOR A REMOTE TERMINAL TO ACCESS A LOCAL NETWORK, CORRESPONDING SERVICE GATEWAY, ACCESS AUTHORIZATION METHOD AND COMPUTER PROGRAM

(71) Applicant: Orange, Paris (FR)

(72) Inventors: Herve Marchand, Vern sur Seiche (FR); Simon Gloanec, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/737,571

(22) PCT Filed: Jun. 3, 2016

(86) PCT No.: PCT/FR2016/051341
§ 371 (c)(1),
(2) Date: Dec. 18, 2017

(87) PCT Pub. No.: WO2016/203131
PCT Pub. Date: Dec. 22, 2016

(65) Prior Publication Data
US 2018/0176038 A1   Jun. 21, 2018

(30) Foreign Application Priority Data

Jun. 18, 2015 (FR) .................... 15 55583

(51) Int. Cl.
*H04L 12/46* (2006.01)
*H04L 29/06* (2006.01)
(Continued)

(52) U.S. Cl.
CPC .......... *H04L 12/4633* (2013.01); *G06F 21/35* (2013.01); *H04L 12/2818* (2013.01); *H04L 63/0272* (2013.01); *H04L 63/0823* (2013.01)

(58) Field of Classification Search
None
See application file for complete search history.

(56) References Cited

U.S. PATENT DOCUMENTS

| 2005/0125692 A1* | 6/2005 | Cox ..................... H04L 63/0236 726/4 |
| 2008/0112405 A1* | 5/2008 | Cholas .................. H04L 63/062 370/389 |

(Continued)

OTHER PUBLICATIONS

International Search Report dated Aug. 23, 2016 for corresponding International Application No. PCT/FR2016/051341, filed Aug. 23, 2016.

(Continued)

*Primary Examiner* — Candal Elpenord
(74) *Attorney, Agent, or Firm* — David D. Brush; Westman, Champlin & Koehler, P.A.

(57) ABSTRACT

A hardware component, a method for a remote terminal to access a local network, a corresponding service gateway, access authorization method and computer program are provided. The hardware component is configured to allow a remote terminal to access a local area communication network. The local area communication network is connected to a wide area communication network via a service gateway, referred to as source gateway. The hardware component includes at least one memory unit including an area for non-volatile storage of at least one identifier for accessing the source gateway, and is configured to connect to the wide area communication network and to the terminal, and to request opening of a secure communication tunnel with the source gateway, from the at least one identifier for accessing the source gateway.

17 Claims, 2 Drawing Sheets

(51) Int. Cl.
    *G06F 21/35*    (2013.01)
    *H04L 12/28*    (2006.01)

(56) References Cited

U.S. PATENT DOCUMENTS

2010/0269169 A1*  10/2010  Huang ................ H04L 12/2821
                                                        726/12
2011/0208863 A1*   8/2011  Le Ber .............. H04L 29/12066
                                                        709/225
2014/0280938 A1    9/2014  Kadaba
2014/0317682 A1   10/2014  Erickson et al.

OTHER PUBLICATIONS

Written Opinion of the International Searching Authority dated Aug. 23, 2016 for corresponding International Application No. PCT/FR2016/051341, filed Aug. 23, 2016.
English Translation of the International Search Report and Written Opinion of the International Searching Authority dated Aug. 23, 2016 for corresponding International Application No. PCT/FR2016/051341, filed Aug. 23, 2016.
"UPnP® Remote Access—Connecting Two Home or Small Business Networks" (http://upnp.org/resources/whitepapers/UPnPRemoteAccessWhitePaper_2012.pdf)—Jun. 2012.

* cited by examiner

HARDWARE COMPONENT AND METHOD FOR A REMOTE TERMINAL TO ACCESS A LOCAL NETWORK, CORRESPONDING SERVICE GATEWAY, ACCESS AUTHORIZATION METHOD AND COMPUTER PROGRAM

CROSS-REFERENCE TO RELATED APPLICATIONS

This Application is a Section 371 National Stage Application of International Application No. PCT/FR2016/051341, filed Jun. 3, 2016, which is incorporated by reference in its entirety and published as WO 2016/203131 A1 on Dec. 22, 2016, not in English.

1. FIELD OF THE INVENTION

The field of the invention is that of communication networks.

More precisely, the invention relates to access by a remote terminal to a local area communication network, i.e. access to the local area network when the terminal is not present in the local area network.

The invention notably finds applications for mobile users, allowing them to remotely access a particular local area network (home, corporate local area network, etc).

2. PRIOR ART

More and more users wish to be able to access their home or business environment, their printer, retrieve their contents, etc., while being remotely connected. For example, a user A wishes to be able to access their home local area network when they are on the move, via their tablet or their smartphone, connected to the Internet.

Remote access to a particular local area network, also called a LAN ("Local Area Network"), has therefore become a necessity for many mobile users.

There are various solutions for covering this need.

These various solutions require the user to install dedicated software on the terminal that they use to connect remotely, e.g. open source software for creating an "Open VPN" virtual private network. They also require the user to provide access identifiers, and optionally the IP address or the FQDN ("Fully Qualified Domain Name" in English) of the local area network which they wish to access.

For example, the user A who wishes to be able to access their home local area network must:

install dedicated software on their tablet or their smartphone, connected to the Internet, enter the access identifiers (login, password) for accessing the service gateway forming the interface between their home local area network and the Internet network, and optionally their IP address or their FQDN.

The architecture may then be based on a third party server for making the connection.

One drawback of such a technique is that it requires the installation of dedicated software on the terminal used by the user. Such software consumes resources of the terminal, which reduces its performance.

Another drawback of such a technique is that it is based on an additional server for making the connection between the terminal used by the user and their LAN, resulting in additional costs and a reduction in security/reliability. In particular, in case of unavailability of such a server (e.g. in case of malfunction or excess load linked to multiple simultaneous connection requests), it is not possible for the user to remotely access their LAN.

There is therefore a need for a new solution for allowing a remote terminal to be able to access a particular local area network.

3. DISCLOSURE OF THE INVENTION

The invention provides a new solution that does not have all of these drawbacks of the prior art, in the form of a hardware component configured for allowing a remote terminal to access a local area communication network, said local area communication network being connected to a wide area communication network via a service gateway, known as the source gateway.

According to at least one embodiment of the invention, such a hardware component includes:

at least one memory including a nonvolatile storage area of at least one access identifier for accessing the source gateway, connection means for connecting to the wide area communication network, connection means for connecting to the terminal, and means for requesting the opening of a secure communication tunnel with the source gateway, on the basis of one or more access identifiers for accessing the source gateway.

Such a hardware component is therefore a physical element (a "dongle" in English), which can connect on the one hand to the terminal wishing to access the local area network associated with the source gateway (LAN), and on the other to the wide area network (WAN for "Wide Area Network"), e.g. the Internet network. It makes it possible to dispense with installing dedicated software on the terminal.

For example, such connection means for connecting to the wide area network and to the terminal are means such as an Ethernet female connector and Ethernet male connector, or USB female connector and USB male connector, or WiFi access point or Bluetooth® access point, etc.

The connection means are preferably direct connection means. Such means thus make it possible to connect the hardware component directly to the terminal, i.e. without intermediate equipment.

Optionally, the hardware component is connected to the wide area network via a service gateway between a second local area communication network and the wide area network, known as the host gateway.

As the hardware component includes a nonvolatile storage area of at least one access identifier for accessing the source gateway serving as an interface between the local area network and the wide area network, it is not necessary for the user to enter these access identifiers when they wish to access the local area network. Indeed, such a nonvolatile storage area makes it possible to store at least one access identifier for permanently or semi-permanently accessing the source gateway in a memory. It is, for example, a read-only memory such as a ROM, EPROM, EEPROM or UVPROM, or a nonvolatile RAM random access memory.

For example, such access identifiers include a login and a password for connecting to the source gateway ("credentials" in English). Optionally, such access identifiers also include a WAN IP or FQDN address of the source gateway.

In particular, such a hardware component includes means for requesting the opening of a secure communication tunnel with the source gateway. It is therefore autonomous, and once connected to the wide area network, it makes it possible to open a secure communication tunnel between same and the source gateway.

A user may thus retrieve their work environment without any constraint related to a configuration or a software installation. The embodiment of such a service on a physical medium therefore simplifies remote access to a particular LAN.

According to one particular feature, the means for requesting the opening of a secure communication tunnel include a remote access client module, capable of communicating with a remote access server module of the source gateway.

For example, these two modules communicate according to a UPnP remote access protocol ("UPnP RA"). The source gateway may thus embed a UPnP RA server software brick and the hardware component a UPnP RA client software brick.

Such a protocol thus makes it possible to easily connect the hardware component and the source gateway, by opening a secure communication tunnel between these two devices.

According to one particular embodiment of the invention, the means for requesting the opening of a secure communication tunnel include means for obtaining at least one item of information for connecting to the source gateway.

Such an item of information for connecting is, for example, a WAN IP address.

As mentioned previously, such an item of information for connecting to the source gateway may, according to a first example, be regarded as an access identifier for accessing the source gateway. The access identifiers for accessing the source gateway may be stored in a memory area of the hardware component, e.g. in the course of a preliminary pairing phase for pairing the hardware component with the source gateway. According to a second example, the pieces of information for connecting to the source gateway are retrieved by the hardware component, e.g. during the opening of the secure communication tunnel. In the case of a service gateway provided by Orange®, more commonly called a "Livebox®", the IP addresses are regularly updated. In this case, the hardware component, embeds, for example, an FQDN (such as the URL of the Livebox®) and then makes a DNS ("Domain Name System" in English) request for obtaining the WAN IP address of the Livebox®.

According to another particular feature of the invention, said at least one memory also includes a storage area of a key and/or of a certificate of authentication of the hardware component and/or of the source gateway.

It is thus possible to improve the security of remote access to the local area network. For example, keys may be embedded in the hardware component in order to ensure the confidentiality of the exchanges with the source gateway.

In particular, such keys and/or certificates may be exchanged between the source gateway and the hardware component in the course of a pairing phase.

According to one example of implementation of the invention, said at least one memory further includes a storage area of a list of terminals authorized to use the hardware component.

In this way, an unauthorized user will not be able to use the hardware component to access the local area network.

In particular, the list of terminals authorized to use the hardware component includes identifiers of terminals that have been made the subject of a pairing with the source gateway.

Such a list may notably be created in the local area communication network.

The list of terminals authorized to use the hardware component is thus constructed in the local area network associated with the source gateway, and not remotely, which offers a greater security for subsequent exchanges.

For example, the list may be created and/or updated automatically, once a terminal is paired with the source gateway, or created and/or updated manually.

The invention also relates to a service gateway intended to connect a local area communication network to a wide area communication network, known as the source gateway.

According to at least one embodiment, such a source gateway includes means of authorizing the opening of a secure communication tunnel with a hardware component as described above, configured for allowing a remote terminal to access the local area communication network.

Such a source gateway acts as an interface between the local area network (computer, tablet, smartphone, connected television, printer, etc., connected to the source gateway via an Ethernet wired connection or a Wi-Fi wireless link, for example) and the wide area network.

In particular, such a source gateway includes means of authorizing the opening of a secure communication tunnel with a hardware component as described above. It is therefore autonomous, and makes it possible to simply open a secure communication tunnel between same and the hardware component.

According to one particular feature, the means of authorizing the opening of a secure communication tunnel include a remote access server module, capable of communicating with a remote access client module of the hardware component.

For example, these two modules communicate according to a remote access protocol such as UPnP ("UPnP RA"). The source gateway may thus embed a UPnP RA server software brick and the hardware component a UPnP RA client software brick.

As already mentioned, such a protocol makes it possible to easily connect the hardware component and the source gateway.

According to one particular embodiment, the hardware component is a detachable element of the source gateway.

Thus, when a user acquires a gateway, e.g. a Livebox®, according to this embodiment, it has a hardware component allowing same to remotely access the local area network thereof.

Moreover, the invention relates to an access method for a remote terminal to access a local area communication network, said local area communication network being connected to a wide area communication network via a service gateway, known as the source gateway.

According to at least one embodiment of the invention, such a method implements the following steps, within a hardware component connected to the wide area communication network and configured for allowing the remote terminal to access the local area communication network:

reading of at least one access identifier for accessing the source gateway, stored in a nonvolatile storage area of at least one memory of the hardware component, requesting the opening of a secure communication tunnel with the source gateway, on the basis of one or more access identifiers for accessing the source gateway.

Such a method may notably be implemented by a hardware component as previously described. The advantages of this method are similar to those of the corresponding hardware component.

In particular, the step of requesting the opening of a secure communication tunnel implements a "UPnP Remote Access" remote access protocol, making it possible to easily connect the hardware component and the source gateway.

According to one specific feature, the step of requesting the opening is preceded by a step of verifying the authorization for using the hardware component by the remote terminal. In this case, the opening of the secure communication tunnel is performed only if the verification is positive.

To do this, the hardware component stores, for example, a list of terminals authorized to use same, and verifies whether the terminal to which it is connected is authorized to communicate with the source gateway prior to the opening of the secure communication tunnel.

According to one particular embodiment, the step of requesting the opening of a secure communication tunnel implements a step of obtaining at least one item of information for connecting to the source gateway.

According to another particular feature, the method includes a preliminary step of pairing the source gateway with the hardware component, implemented prior to the step of requesting the opening of a secure communication tunnel.

Such a pairing notably makes it possible to store the access identifiers for accessing the source gateway in a storage area of the hardware component, and optionally allows an exchange of keys and/or certificates of authentication between the hardware component and the source gateway.

According to one particular embodiment, the step of requesting the opening of a secure communication tunnel also implements a step of authenticating the hardware component and/or the source gateway.

As already mentioned, it is thus possible to improve the security of remote access to the local area network.

The invention further relates to a method for authorizing a remote terminal to access a local area communication network, said local area communication network being connected to a wide area communication network via a service gateway, known as the source gateway.

According to at least one embodiment, such a method implements, within the source gateway, a step of authorizing the opening of a secure communication tunnel with a hardware component configured for allowing the remote terminal to access the local area communication network.

Such a method may notably be implemented by a source gateway as previously described. The advantages of this method are similar to those of the corresponding source gateway.

In particular, such a method includes a step of obtaining a correspondence table between a hardware component identifier and a list of terminals authorized to use the hardware component. In this case, the step of authorizing the opening of a secure communication tunnel is implemented only if the terminal belongs to the list.

To do this, the source gateway stores a correspondence table between a component identifier and a list of terminals authorized to use this component, and verifies whether the hardware component requesting the opening of a secure communication tunnel with the source gateway is connected with an authorized terminal.

The invention further relates, according to at least one embodiment, to at least one computer program comprising instructions for the implementation of at least one step of the access method for a remote terminal to access a local area communication network as described above, and/or instructions for implementing at least one step of the method for authorizing a remote terminal to access a local area communication network as described above, when this or these programs are executed by one or more processors.

In particular, the various steps of the access method for a remote terminal to access a local area communication network are implemented by one or more software packages or computer programs, including software instructions intended to be carried out by a data processor of the hardware component according to an embodiment of the invention. The various steps of the method for authorizing a remote terminal to access a local area communication network are also implemented by one or more software packages or computer programs, including software instructions intended to be executed by a data processor of the source gateway according to an embodiment of the invention.

4. LIST OF FIGURES

Other features and advantages of the invention will appear more clearly on reading the following description of a particular embodiment, given as a simple, illustrative and non-restrictive example, and the appended drawings, in which.

5. DESCRIPTION OF AN EMBODIMENT OF THE INVENTION

The general principle of the invention is based on the use of a hardware component, intended to be connected between a wide area communication network and a terminal, allowing the terminal to remotely access a local area communication network.

To do this, such a hardware component includes at least one nonvolatile storage area of at least one access identifier for accessing a service gateway serving as an interface between the local area network and the wide area network, known as the source gateway, and embeds a functionality of remote access to this source gateway.

A description is given below of the main steps implemented by a hardware component and by a source gateway, for a terminal connected to the hardware component to be able to remotely access a source gateway serving as an interface between the local area network and the wide area network.

Figure 1:
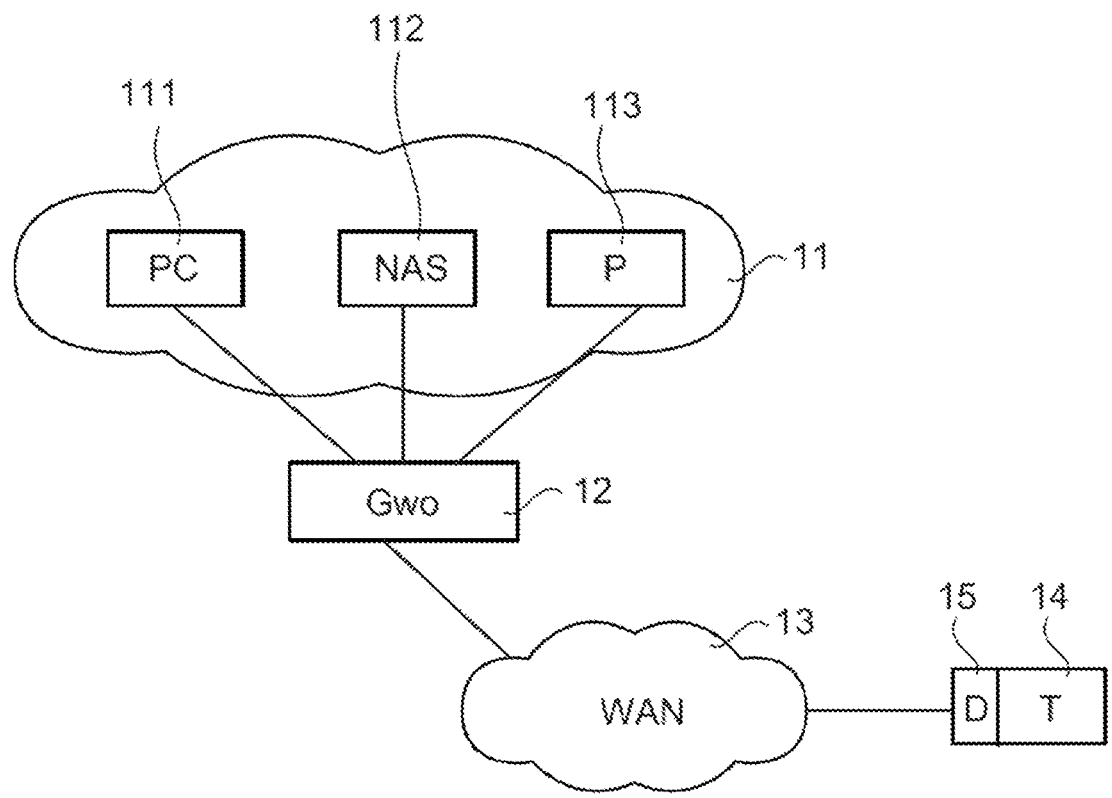
FIG. 1 depicts an example of a local area network and of a wide area network, allowing remote access from a terminal to the local area network.

As an example, as illustrated in FIG. 1, a local area network LAN 11 is considered including a personal computer PC 111, a network storage server NAS 112, and a printer P 113. A source gateway GWo 12 makes it possible for the various equipment of the local area network 11 to be connected thereto (via an Ethernet wired connection or a Wi-Fi wireless link, for example) in order to exchange data therebetween but also with the outside. The source gateway 12 therefore acts as an interface between the local area network 11 and a wide area network WAN 13, such as the Internet network. This gateway may further be called a "subscriber gateway", since according to one particular embodiment, it allows a "subscriber" user, who subscribes to a service, to remotely access their local area network 11.

A terminal T 14 is also considered, not present in the local area network 11, that a user wishes to use for accessing the local area network 11, and a hardware component D 15 connected between the terminal 14 and the wide area network 13.

Figure 2:
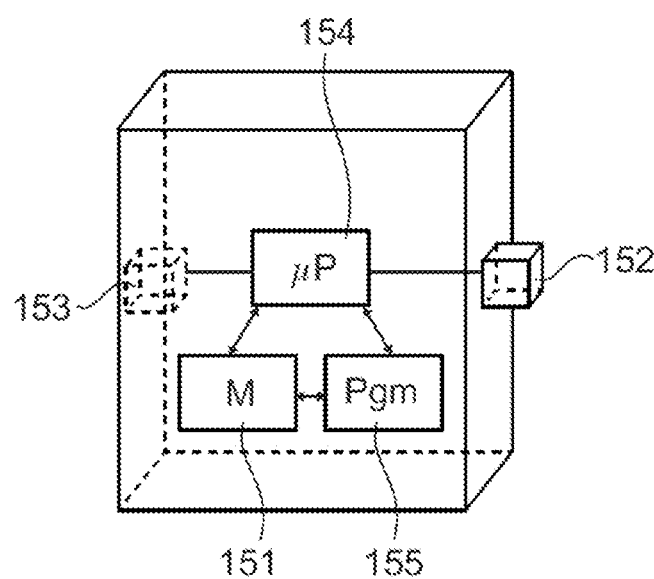
FIG. 2 illustrates the simplified structure of a hardware component according to one embodiment of the invention.

As illustrated in FIG. 2, such a component 15 includes, in a simplified way:
- at least one memory M 151 including a nonvolatile storage area of at least one access identifier for accessing the source gateway 12,
- connection means 152 for connecting to the wide area communication network 13,
- direct connection means 153 for connecting to the terminal 14, and
- means for requesting the opening of a secure communication tunnel with the source gateway 12, on the basis of one or more access identifiers for accessing the source gateway.

For example, the connection means 152 for connecting to the wide area network 13 include an Ethernet male connector and the connection means 153 for connecting to the terminal 14 include an Ethernet female connector, or vice versa. According to a second example, the connection means 152 for connecting to the wide area network 13 include a USB male connector and the connection means 153 for connecting to the terminal 14 include a USB female connector, or vice versa. According to a third embodiment, the connection means 152 for connecting to the wide area network WAN 13 and the connection means 153 for connecting to the terminal T 14 include a WiFi access point or a Bluetooth® access point, etc.

The means for requesting the opening of a secure communication tunnel between the hardware component 15 and the source gateway 12 implement, for example, a processing unit 154, provided, for example, with a microprocessor μP, and controlled by the computer program 155, implementing an access method for the remote terminal 14 to access the local area network 11, according to a particular embodiment of the invention. On initialization, the code instructions of the computer program 155 are, for example, loaded into a RAM memory before being executed by the microprocessor of the processing unit 154.

Figure 3A:
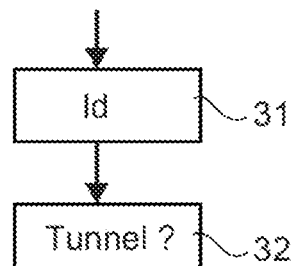
FIGS. 3A and 3B depict the main steps implemented by a hardware component and a source gateway according to one embodiment of the invention.

As illustrated in FIG. 3A, for allowing the remote terminal 14 to access the local area network 11, the hardware component 15 implements an access authorization method including the following main steps:
- reading 31 of at least one access identifier for accessing the source gateway 12, stored in a nonvolatile storage area of the memory 151 of the hardware component,
- requesting 32 the opening of a secure communication tunnel with the source gateway 12, on the basis of one or more access identifiers for accessing the source gateway.

Figure 3B:
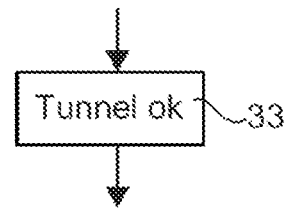

As illustrated in FIG. 3B, for authorizing the remote terminal 14 to access the local area network 11, the source gateway 12 in turn implements an access authorization method including a step 33 of authorizing the opening of a secure communication tunnel with the hardware component 15.

Figure 4:
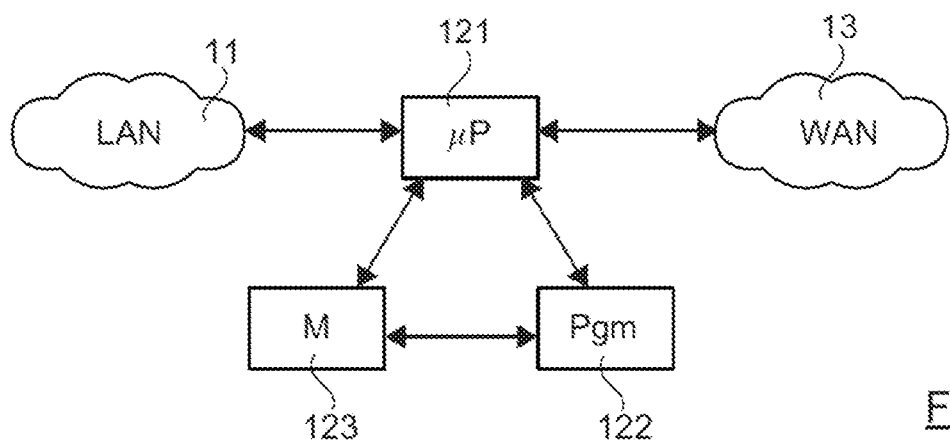
FIG. 4 illustrates the simplified structure of a source gateway according to one embodiment of the invention.

FIG. 4 illustrates in a simplified way the structure of a source gateway intended to connect the local area network 11 to the wide area network 13 according to one embodiment of the invention. Such a source gateway 12 includes means of authorizing the opening of a secure communication tunnel with the hardware component 15 configured for allowing the remote terminal 14 to access the local area network 11.

The means of authorizing the opening of a secure communication tunnel between the hardware component 15 and the source gateway 12 implement, for example, a processing unit 121, provided, for example, with a microprocessor RP, and controlled by the computer program 122, implementing an access authorization method for authorizing the remote terminal 14 to access the local area network 11, according to a particular embodiment of the invention. On initialization, the code instructions of the computer program 122 are, for example, loaded into a RAM memory 123 before being executed by the microprocessor of the processing unit 121.

For example, the means for requesting the opening of a secure communication tunnel of the hardware component 15 include a remote access client module and the means of authorizing the opening of a secure communication tunnel of the source gateway 12 implement a remote access server module. These two modules may communicate according to a UPnP remote access ("UPnP RA") protocol.

Described below is an example of an application of the invention, allowing a user A to access their local home local area network when they are at a user B's, via user B's service gateway, called a "host gateway", or any other Internet access.

Figure 5:
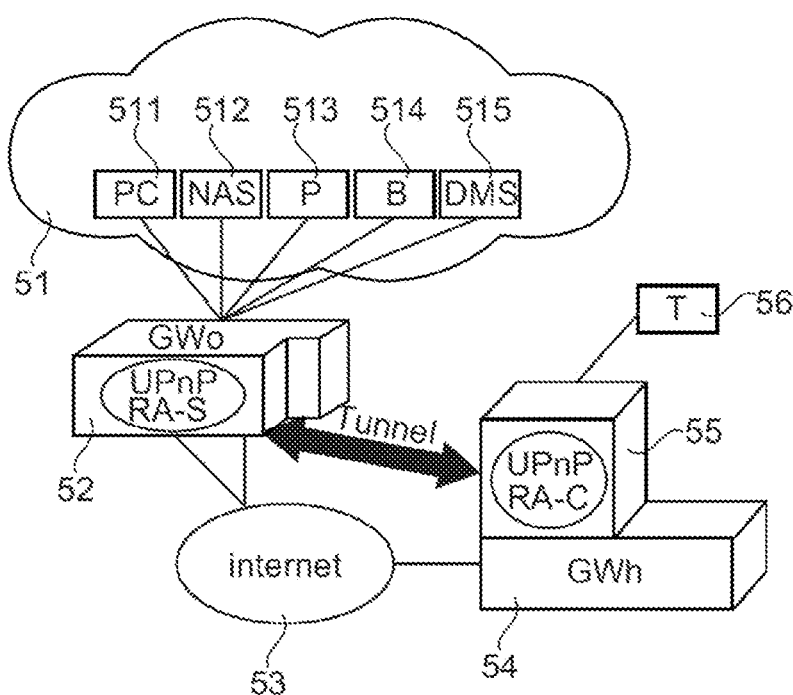
FIG. 5 illustrates an example of an application of the invention according to a particular embodiment, allowing remote access from a terminal to a remote local area network via a host gateway.

According to this example, illustrated in FIG. 5, user A's local area network 51 includes a personal computer PC 511, a networked storage server NAS 512, a printer P 513, a toolbox B 514 notably making it possible to share multimedia content, create a Wi-Fi network and recharge devices (e.g. of the "Homepoint®" type), and a multimedia server DMS 515. A source gateway GWo 52 serves as an interface between user A's local area network 51 and the Internet network 53.

A host gateway GWh 54 is also considered, serving as an interface between the Internet network 53 and user B's local area network. Such a host gateway is used, according to this example of an application, as an access point for accessing the Internet network.

User A, when they are at user B's, may access their own home network 51, via a terminal T 56 (which may belong to them, belong to user B, etc.), via a hardware component 55 connected between the terminal 56 and the host gateway 54, according to an embodiment of the invention.

According to this example of an application, it is considered that the source gateway 52 embeds a UPnP RA server software brick and that the hardware component 55 embeds a UPnP RA client software brick.

For example, the hardware component 55 is a detachable physical element of the source gateway 52. Thus, when purchasing the source gateway 52, the hardware component 55 is supplied with the source gateway 52. The access identifier or identifiers for accessing the source gateway 52 may thus be stored in a storage area of the hardware component 55 prior to the installation of the source gateway at user A's. As a variant, the access identifier or identifiers for accessing the source gateway 52 may be stored in a storage area of the hardware component 55 during a pairing phase of the source gateway 52 and the hardware component 55.

Optionally, exchanges of keys and/or certificates of authentication of the hardware component and/or of the source gateway may be implemented prior to the installation of the source gateway at user A's, or during the pairing phase, in order to improve the security of subsequent exchanges. Such exchanges of keys, or sharing of secrets, between the hardware component and the source gateway, are implemented according to a conventional technique, not described here. For example, such a technique is the "SSL 2 way" technique.

When the hardware component 55 knows the access identifier or identifiers for accessing the source gateway 52, it/they may be used by user A, at user B's, to access user A's home local area network.

According to this example of an application, such a hardware component can therefore be detached from the source gateway 52 and transported, to be able to be used at user B's. It possesses Ethernet connectivity, for example, allowing same to be connected to one of the ports of user B's host gateway 54 and to access the Internet network 53. In addition, it embeds the software bricks needed for remotely accessing the local area network 51 (CPU, ROM or nonvolatile RAM, UPnP RA client) and the information allowing secure remote access. The source gateway 52 in turn embeds the software bricks needed for authorizing remote access to the local area network 51 (UPnP RA server).

When the hardware component 15 is connected to the host gateway 54, the hardware component itself ensures the connection of user A's local area network 51 and user B's local area network.

More precisely, the hardware component 15 uses the information allowing secure, remote access, stored in at least one nonvolatile storage area of a memory of the hardware component, and exchanges of messages between the UPnP RA client thereof and the UPnP RA server of the source gateway 52, to create a secure communication tunnel between the hardware component 15 and the source gateway 52. The hardware component 15 may thus connect with the UPnP server of the source gateway 52. The document "UPnP® Remote Access—Connecting Two Home or Small Business Networks" (http://upnp.org/resources/whitepapers/UPnPRemoteAccessWhitePaper_2012.pdf)—June 2012—describes in more detail the exchanges of messages according to a UPnP remote access protocol.

For example, the information allowing secure remote access includes access identifiers associated with the source gateway 52 (e.g. login, password, and optionally the FQDN of the source gateway), optionally information related to security (keys and/or certificates of authentication of the hardware component and/or of the source gateway, shared secrets, etc.) and optionally information related to a Wi-Fi access point of the hardware component. The hardware component 55 may indeed possess its own Wi-Fi access point, which is used when the hardware component 55 is connected to a host gateway 54. According to this example, the Wi-Fi access point of the hardware component 55 has the same SSID identifier ("Service Set Identifier") and the same password as the source gateway 52. This information allowing secure remote access is used by the UPnP RA client of the hardware component 55 to establish a connection with the UPnP RA server of the source gateway 52.

User A may thus access their remote LAN immediately and without any configuration.

Optionally, a list of terminals authorized to use the hardware component may be stored in a storage area of a memory of the hardware component. For example, only user A's smartphone and tablet may be authorized to use the hardware component 55. In this way, even if the hardware component 55 is connected to user B's host gateway 54, user B will not be able to access user A's local area network from user B's own terminals.

According to this example, the step of requesting the opening (32) may be preceded by a step of verifying the authorization for using the component by the remote terminal, and the opening will only take place if the verification is positive.

As already mentioned, such a list may notably be created in user A's local area network, with the equipment of user A's local area network (PC 511, for example). The list may be created and/or updated automatically, once a terminal is paired with the source gateway, or created and/or updated manually.

The invention claimed is:

1. A hardware component configured for allowing a remote terminal to access a local area communication network,
   said local area communication network being connected to a wide area communication network via a service gateway, known as a source gateway,
   wherein said hardware component is a detachable physical element of the source gateway and wherein said hardware component includes:
   at least one memory including a nonvolatile storage area storing at least one access identifier for accessing said source gateway, said at least one access identifier being stored in the storage area of the hardware component either prior to local installation of the source gateway in the local area communication network or in a preliminary phase of pairing the source gateway with the hardware component,
   connection means for connecting to said wide area communication network,
   connection means for connecting to said terminal, and
   means for requesting the opening of a secure communication tunnel with said source gateway, on the basis of said at least one access identifier for accessing said source gateway.

2. The hardware component as claimed in claim 1, wherein said means for requesting the opening of a secure communication tunnel include a remote access client module, capable of communicating with a remote access server module of said source gateway.

3. The hardware component as claimed in claim 1, wherein said means for requesting the opening of a secure communication tunnel include means for obtaining at least one item of information for connecting to said source gateway.

4. The hardware component as claimed in claim 1, wherein said at least one memory also includes a storage area of a key and/or of a certificate of authentication of said hardware component and/or of said source gateway.

5. The hardware component as claimed in claim 1, wherein said at least one memory further includes a storage area of a list of terminals authorized to use said hardware component.

6. The hardware component as claimed in claim 5, wherein said list of terminals authorized to use said hardware component includes identifiers of terminals that have been made the subject of a pairing with said source gateway.

7. The hardware component as claimed in claim 5, wherein said list of terminals authorized to use said hardware component is created in said local area communication network.

8. The hardware component as claimed in claim 1, wherein said connection means are direct connection means.

9. A source gateway intended to connect a local area communication network to a wide area communication network, wherein the source gateway comprises:
   a hardware component that is a detachable physical element of the source gateway and that includes at least one memory including a nonvolatile storage area storing at least one access identifier for accessing said source gateway, said at least one access identifier being stored in the storage area of the hardware component either prior to local installation of the source gateway in the local area communication network or in a preliminary phase of pairing the source gateway with the hardware component, a processor; and a non-transitory computer-readable medium comprising instructions stored thereon, which when executed by the processor configure the source gateway to perform acts comprising:

receiving a request from the hardware component, previously detached from the source gateway, for opening a secure communication tunnel with the hardware component to allow a remote terminal to access said local area communication network on the basis of the at least one access identifier; and authorizing the opening of the secure communication tunnel based on the request.

10. The source gateway as claimed in claim 9, further comprising a remote access server module, capable of communicating with a remote access client module of said hardware component.

11. An access method for a remote terminal to access a local area communication network, said local area communication network being connected to a wide area communication network via a service gateway, known as a source gateway, said source gateway comprising a hardware component that is a detachable physical element of the source gateway and that includes at least one memory including a nonvolatile storage area storing at least one access identifier for accessing said source gateway, said at least one access identifier being stored in the storage area of the hardware component either prior to local installation of the source gateway in the local area communication network or in a preliminary phase of pairing the source gateway with the hardware component, wherein said method implements the following acts, within the hardware component, previously detached from the source gateway, connected to said wide area communication network and configured for allowing said remote terminal to access said local area communication network:

reading the at least one access identifier for accessing said source gateway, stored in the nonvolatile storage area;

requesting opening of a secure communication tunnel with said source gateway, on the basis of said at least one access identifier for accessing said source gateway.

12. The access method as claimed in claim 11, wherein the act of requesting the opening is preceded by an act of verifying the authorization for using said hardware component by said remote terminal, and wherein the opening of said secure communication tunnel is performed if the verification is positive.

13. The access method as claimed in claim 11, wherein said act of requesting the opening of a secure communication tunnel implements a "UPnP Remote Access" remote access protocol.

14. An access authorization method for authorizing a remote terminal to access a local area communication network, said local area communication network being connected to a wide area communication network via a service gateway, known as a source gateway, said source gateway comprising a hardware component that is a detachable physical element of the source gateway and that includes at least one memory including a nonvolatile storage area storing at least one access identifier for accessing said source gateway, said at least one access identifier being stored in the storage area of the hardware component either prior to local installation of the source gateway in the local area communication network or in a preliminary phase of pairing the source gateway with the hardware component, wherein said method implements, within said source gateway:

receiving a request from the hardware component, previously detached from the source gateway, for opening a secure communication tunnel with the hardware component to allow the remote terminal to access said local area communication network, on the basis of said at least one access identifier, authorizing opening of the secure communication tunnel based on the request.

15. The access authorization method as claimed in claim 14, further comprising obtaining a correspondence table between a hardware component identifier and a list of terminals authorized to use said hardware component, and in step of authorizing the opening of a secure communication tunnel is implemented if said terminal belongs to said list.

16. A non-transitory computer-readable medium comprising a computer program stored thereon, which comprises instructions for implementing an access method for a remote terminal to access a local area communication network, when this program is executed by a processor, said local area communication network being connected to a wide area communication network via a service gateway, known as a source gateway, said source gateway comprising a hardware component that is a detachable physical element of the source gateway and that includes at least one memory including a nonvolatile storage area storing at least one access identifier for accessing said source gateway, said at least one access identifier being stored in the storage area of the hardware component either prior to local installation of the source gateway in the local area communication network or in a preliminary phase of pairing the source gateway with the hardware component, wherein said method implements the following acts, within the hardware component previously removed from the source gateway, connected to said wide area communication network and configured for allowing said remote terminal to access said local area communication network:

reading the at least one access identifier for accessing said source gateway, stored in the nonvolatile storage area;

requesting opening of a secure communication tunnel with said source gateway, on the basis of said at least one access identifier for accessing said source gateway.

17. A non-transitory computer-readable medium comprising a computer program stored thereon, which comprises instructions for implementing a method for authorizing a remote terminal to access a local area communication network, when this program is executed by a processor, said local area communication network being connected to a wide area communication network via a service gateway, known as a source gateway, said source gateway comprising a hardware component that is a detachable physical element of the source gateway and that includes at least one memory including a nonvolatile storage area storing at least one access identifier for accessing said source gateway, said at least one access identifier being stored in the storage area of the hardware component either prior to local installation of the source gateway in the local area communication network or in a preliminary phase of pairing the source gateway with the hardware component, wherein said method implements, within said source gateway:

receiving a request from the hardware component, previously removed from the source gateway, for opening a secure communication tunnel with the hardware component to allow the remote terminal to access said local area communication network, on the basis of said at least one access identifier, authorizing opening of the secure communication tunnel based on the request.

* * * * *